(12) United States Patent
Myers

(10) Patent No.: US 6,224,272 B1
(45) Date of Patent: May 1, 2001

(54) FILM LOADING INDICATOR

(75) Inventor: Keith Myers, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/208,343

(22) Filed: Dec. 9, 1998

(51) Int. Cl.[7] .................................................. G03B 17/26
(52) U.S. Cl. .................................... 396/515; 242/358.1
(58) Field of Search ........................ 396/515; 29/894.12; 242/358.1, 407

(56) References Cited

U.S. PATENT DOCUMENTS

| | | | |
|---|---|---|---|
| 2,503,734 | * 4/1950 | Hendel | 242/407 |
| 2,503,756 | * 4/1950 | Mihalyi | 242/407 |
| 4,058,823 | 11/1977 | Mitchell et al. . | |
| 4,682,870 | 7/1987 | Atkinson . | |
| 5,032,862 | 7/1991 | Behnke . | |
| 5,232,175 | * 8/1993 | Zander et al. | 396/515 |
| 5,404,188 | 4/1995 | Takahashi et al. . | |

\* cited by examiner

*Primary Examiner*—David M. Gray
(74) *Attorney, Agent, or Firm*—Susan L. Parulski

(57) ABSTRACT

An indicator on a film cartridge to indicate whether a film cartridge has been used in a photographic camera. The film cartridge includes a spool having an elongate coaxial hole open at one end. An indicator, disposed within the coaxial hole, is deformable from a first state to a second state in response to the film cartridge being received by a plunger in the photographic camera; the second state being visually different than the first state. The indicator has a continuous, non-punctured, non-fractured configuration when in both the first and second states.

17 Claims, 5 Drawing Sheets

FILM LOADING INDICATOR

FIELD OF THE INVENTION

The present invention relates generally to camera apparatus, and more particularly relates to an indicator on a film cartridge to indicate whether the film cartridge has been used in a photographic camera.

BACKGROUND OF THE INVENTION

A user can generally determine whether a filmstrip disposed within a film cartridge has been exposed. For example, as illustrated in FIG. 1, a typical unexposed 35mm film product has a portion of a filmstrip 10 positioned outside of a film cartridge 12. Once the filmstrip has been exposed, the entire filmstrip is wound into the film cartridge; no portion of the filmstrip remains outside of the film cartridge. As such, a user is able to determine whether the filmstrip has been exposed.

However, for some photographic film products, such a visual inspection does not provide an indication of whether a filmstrip has been exposed. For example, for typical APS film product, no portion of the filmstrip is positioned outside of the film cartridge when the filmstrip is both unexposed and exposed. In contrast, for other types of film product, a portion of the filmstrip is positioned outside of the film cartridge when the filmstrip is both unexposed and exposed. Thus, a user is not able to determine the state (i.e., unexposed or exposed) of the filmstrip from the positioning of the filmstrip relative to the film cartridge.

Failure to recognize an exposed filmstrip can be detrimental since an exposed filmstrip may be re-exposed (i.e., double exposure). Conversely, failure to recognize an unexposed filmstrip may cause the unexposed filmstrip to be wasted by passage through a developing process without producing an image.

U.S. Pat. No. 5,032,862 (Behnke) discloses an indicator to indicate that a film cartridge has been used. Behnke teaches a film spool having a frangible indicator layer located to extend proximate the outer side of face of the end wall or canister end cap. The frangible indicator layer is penetrated by a plunger and punctured when the filmstrip is exposed.

U.S. Pat. No. 5,404,188 (Takahashi et al) discloses a film cartridge which is provided with a first indicating member which is to be broken in response to the loading of the film in a camera, and a second indicating member which is to be broken in response to a specific photographing method, such as panoramic photographing.

U.S. Pat. No. 4,682,870 (Atkinson), commonly assigned, relates to a particular type of camera requiring an exposed film to receive special handling by a photofinisher. A film spool includes a coaxial hole opening at one end of the spool and a readily fracturable element located within the coaxial hole.

While such apparatus may have achieved certain degrees of success in their particular applications, each apparatus requires the destruction of a component as an indication of film exposure. Such destruction can generate debris or other fragments which can interfere with the operation of the camera. Indeed, such debris can be detrimental to the operation of the camera or the exposure of the filmstrip.

Accordingly, a need continues to exist for an indicator to indicate that a filmstrip has been exposed wherein no destruction of a component is required, and no debris is generated.

SUMMARY OF THE INVENTION

An object of the present invention is to provide an indicator to indicate whether a filmstrip of a film cartridge has been exposed.

Another object of the invention is to provide such an indicator wherein no debris is generated.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a film cartridge for use in a photographic camera having a plunger adapted to receive the film cartridge. The film cartridge includes a film spool having an elongate coaxial hole open at one end of the film spool and an indicator disposed within the coaxial hole. The indicator is deformable from a first state to a second state in response to being received by the plunger in the photographic camera. The second state is different than the first state, and the indicator has a continuous, non-punctured, non-fractured configuration when in both the first and second states.

According to another aspect of the invention, there is provided a photographic camera comprising a film cartridge and a film cartridge chamber for receiving the film cartridge. The film cartridge includes a film spool having an elongate coaxial hole open at one end of the film spool. Disposed within the coaxial hole of the film spool is an indicator which is deformable from a first state to a second state different than the first state. In both the first and second states, the indicator has a continuous, non-punctured, non-fractured configuration. The film cartridge chamber has a plunger receivable in the coaxial hole of the film spool at the open end. The indicator deforms from the first state to the second state in response to being received by the plunger, whereby an indication is provided that the film cartridge has been used in the photographic camera.

As such, the present invention provides an indicator on a film cartridge to indicate that a filmstrip has been exposed wherein no debris is generated.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
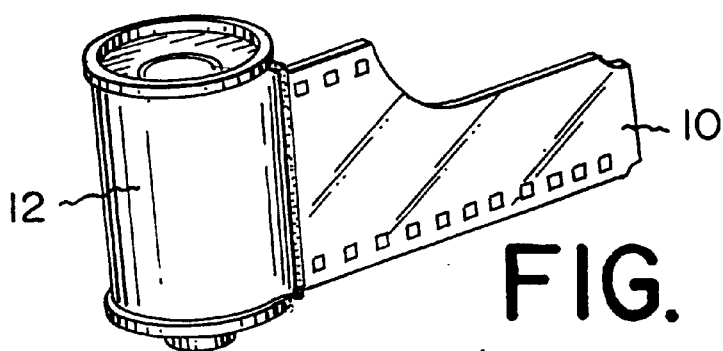
FIG. 1 shows a prior art film cartridge with a portion of a filmstrip protruding from the film cartridge.

The following is a detailed description of the preferred embodiments of the invention, reference being made to the drawings in which the same reference numerals identify the same elements of structure in each of the several figures.

Figure 2:
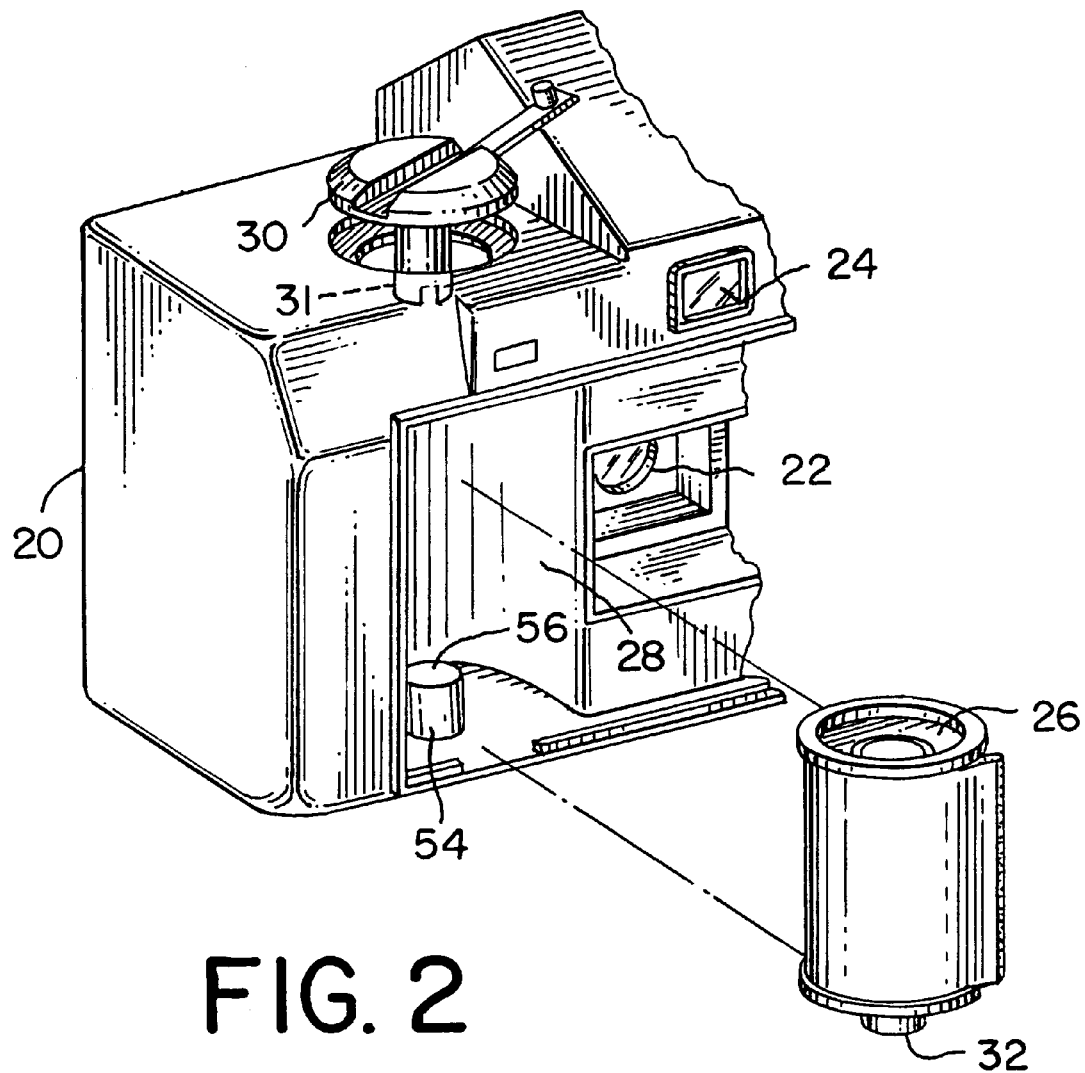
FIG. 2 shows a perspective view of a photographic camera adapted to receive a film cartridge.

FIG. 2 shows a photographic camera 20 having a lens 22 for focusing an image of a subject being photographed. An eye lens 24 enables a user to view the subject being photographed. A film cartridge 26 is configured to be received within a film cartridge chamber 28 of camera 20. Film cartridge 26 includes a spool 32 onto which a length of filmstrip is wound. The filmstrip disposed within film cartridge 26 can be any photographic product, such as for example, 35 mm film and APS film.

While many known cameras include automatic means for advancing the filmstrip in the camera and/or rewinding an exposed filmstrip into the film cartridge, some known cameras include a manual film advance/rewind knob disposed on the camera which is rotated to permit manual advance or rewind of the film within film cartridge 26. FIG. 2 illustrates a manual film advance/rewind knob 30 which generally includes a shaft 31 which can be inserted through spool 32 of film cartridge 26.

Figure 3:
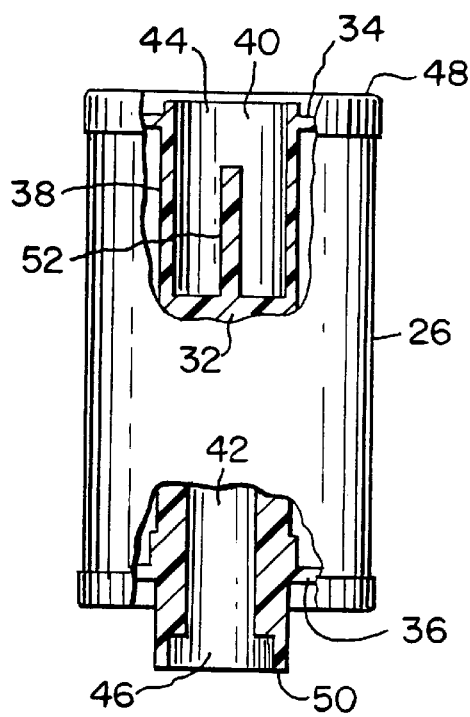
FIG. 3 shows a side elevation of a film cartridge in partial cross-sectional view.

As more particularly illustrated in FIG. 3, spool 32 typically includes a pair of parallel spaced, annular flanges 34,36 and a core 38 extending between the flanges. Core 38 has a pair of elongate coaxial holes 40,42. Respective openings 44,46 are disposed at opposite ends 48,50 of core 38, and are accessible from outside of the film cartridge to gain entry into the coaxial holes. Extending across at least a portion of the coaxial hole is a rib 52. As configured, shaft 31 of knob 30 (shown in FIG. 2) can be inserted through one of the open ends of film cartridge 26 into one of the coaxial holes of the film cartridge. For example, shaft 31 could be inserted through opening 44 and engage rib 52 to effect the advancing/rewinding of the filmstrip.

Figure 4:
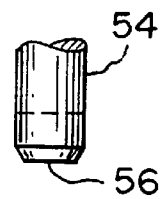
FIG. 4 shows a side elevation of a plunger suitable for use with the present invention.

Referring now to FIGS. 2 and 3, disposed within film cartridge chamber 28 is a plunger 54 which is coaxially mounted with shaft 31. Plunger 54 is configured to receive the film cartridge. As such, plunger 54 has an end configured adapted for insertion through opening 46 into hole 42. As will become more apparent, plunger 54 includes an end 56 which is free of a sharp edge, such as illustrated in FIG. 4. More particularly, end 56 of plunger 54 does not include a knife edge or other sharp edge which could puncture or penetrate.

Figure 5:
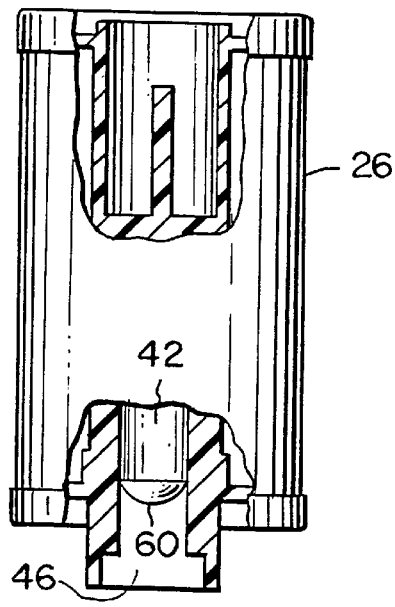
FIG. 5 shows a side elevation of a film cartridge in partial cross-sectional view, and an indicator in a first state according to a first embodiment of the present invention.
Figure 6:
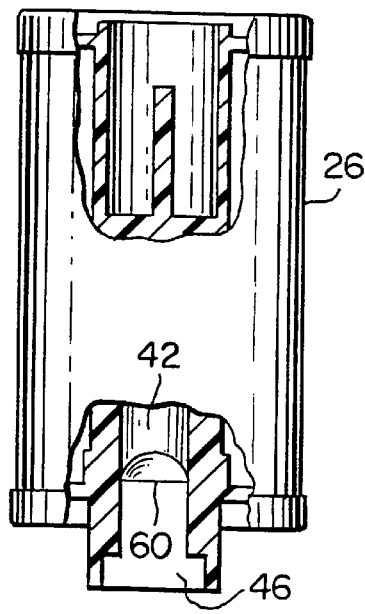
FIG. 6 shows a side elevation of a film cartridge in partial cross-sectional view, and an indicator in a second state according to a first embodiment of the present invention.

FIGS. 5 and 6 show a first embodiment of a film loading indicator in accordance with the present invention. Configured for disposal within coaxial hole 42 is an indicator 60 which is deformable from a first state to a second state in response to film cartridge 26 being received by plunger 54. As will more fully described, indicator 60 has a configuration in the first state which can be deformed, the second state is visually different than the first state, and indicator 60 has a continuous, non-punctured, non-fractured configuration when in both the first and second states.

As shown in FIG. 5, in its first state, indicator 60 is configured as having a cup or convex shape. To be disposed within coaxial hole 42, indicator 60 has a circular shape of a diameter substantially equal to the diameter of coaxial hole 42. When film cartridge 26 is received in camera 20, plunger 54 is inserted through opening 46 into hole 42, and end 56 abuts indicator 60. As end 56 is further received into opening 46, end 56 causes indicator 60 to deform into its second state, as shown in FIG. 6, which is different than the first state. As illustrated in FIG. 6, indictor 60 has a concave shape. Accordingly, indicator 60 is changed from the first state to the second state in response to film cartridge 26 being received by plunger 54. Thus, the changing of the indicator from a convex to concave shape (such as occurs on a fountain drink cup lid to indicate which type of drink is contained within the cup, i.e., cola, diet, root beer, other), provides a user with an indication of whether the filmstrip within the film cartridge has been exposed.

The material comprising indicator 60 allows for the deformation from the first state to the second state. That is, indicator 60 is comprised of a material which is pliable, malleable, or moldable, yet capable of being deformed. Plunger 54 does not puncture or fracture indicator 60. Rather, indicator 60 maintains a continuous, non-punctured, non-fractured configuration when in both the first and second states. As such, no debris is generated. Once deformed into the second state, the material of indicator 60 maintains the second state. While such a deformation need not be permanent, the deformation is maintainable until a specific action is taken by a user, for example, removal of indicator 60 from film cartridge 26. Examples of suitable materials for indicator 60 include polystyrene or similar plastic material. Alternative materials include aluminum or paper, or any combination.

Figure 7:
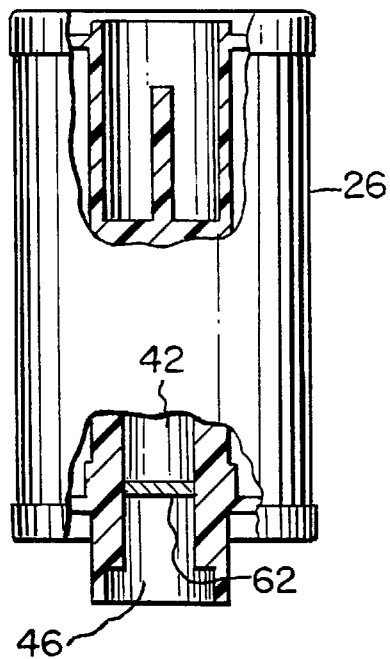
FIG. 7 shows a side elevation of a film cartridge in partial cross-sectional view, and an indicator in a first state according to a second embodiment of the present invention.
Figure 8:
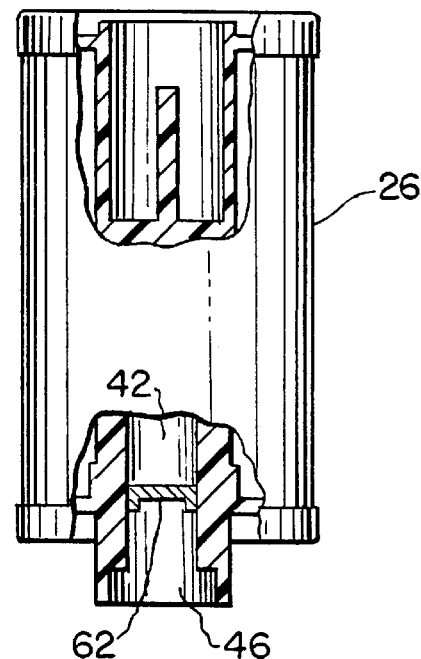
FIG. 8 shows a side elevation of a film cartridge in partial cross-sectional view, and an indicator in a second state according to a second embodiment of the present invention.

A second embodiment of the film loading indicator in accordance with the present invention is shown in FIGS. 7 and 8. Configured for disposal within coaxial hole 42 is an indicator 62 which is deformable from a first state to a second state in response to film cartridge 26 being received by plunger 54. As shown in FIG. 7, in its first state, indicator 62 is configured as being planar. To be disposed within coaxial hole 42, indicator 62 has a circular shape of a diameter substantially equal to the diameter of coaxial hole 42. When film cartridge 26 is received in camera 20, plunger 54 is inserted through opening 46 into hole 42, and end 56 abuts indicator 62, causing indicator 62 to deform into its second state, as shown in FIG. 8. As illustrated in FIG. 8, indictor 62 has non-planar shape of a U-shape or "cup" shape. Other non-planar shapes may be obtained dependent on the configuration of end 56 of plunger 54. As with the first embodiment, indicator 62 is comprised of a material which allows for the deformation wherein indicator 62 maintains a continuous, non-punctured, non-fractured configuration when in both the first and second states.

Figure 9:
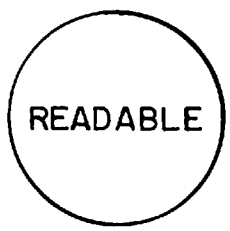
FIG. 9 shows a top elevation of an indicator in a first state according to a fifth embodiment of the present invention.
Figure 10:
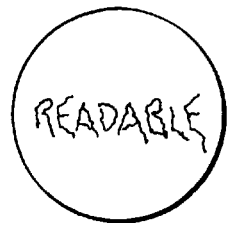
FIG. 10 shows a top elevation of an indicator in a second state according to a fifth embodiment of the present invention.

Other embodiments may be possible. For example, in a third embodiment, reception of the film cartridge by the plunger may cause the indicator to change colors. That is, the first state may be of a first color and a second state may be of a second color different than the first color. Such an embodiment may occur, for example, when the color characteristics of the indicator's material is affected by stress/strain. In a fourth embodiment, the first state may be opaque and the second state may be transparent. In a fifth embodiment, the first state may include readable indicia and the second state include non-readable indicia, as illustrated in FIGS. 9 and 10. Such an embodiment may occur when the plunger causes the readable indicia to become unreadable - such as by stretching the material to blur the indicia. As with the first and second embodiments previously described above, the indicator of these further embodiments maintains a continuous, non-punctured, non-fractured configuration when in both the first and second states.

Figure 11:
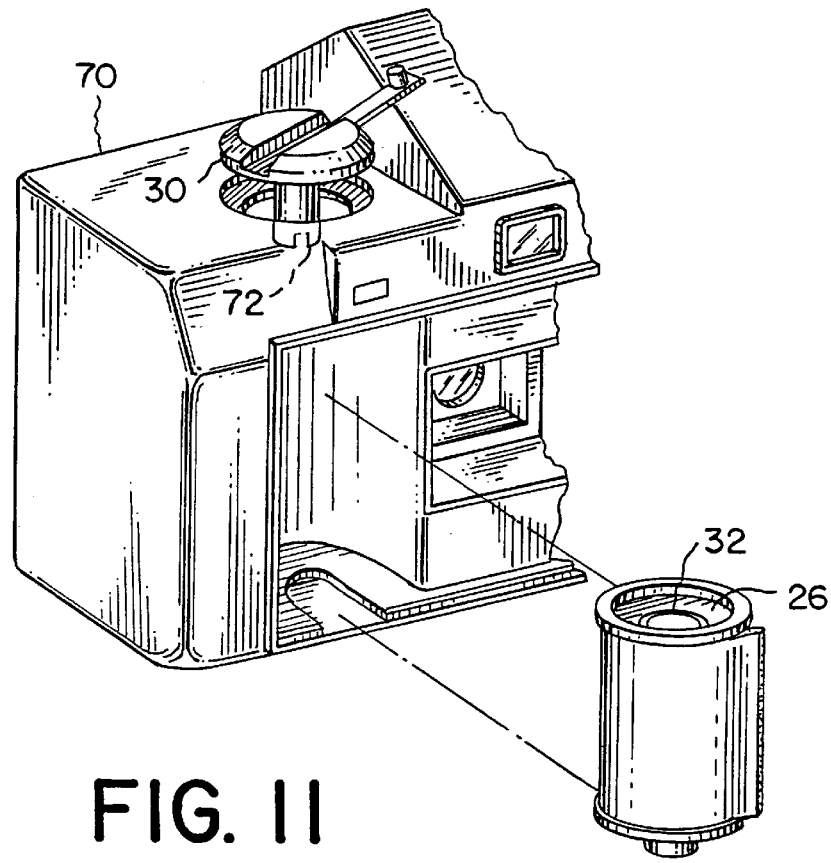
FIG. 11 shows a perspective view of a photographic camera adapted to receive a film cartridge.

Those skilled in the art will recognize that, while the indicator has been illustrated as being disposed within hole 42 of opening 46, the indicator can alternatively be disposed within hole 40 of opening 44. Such an alternative may be desirable if, for example, the camera does not include a plunger 54, but rather, includes only advance/rewind knob 30. Such a camera 70 is illustrated in FIG. 11. As illustrated, knob 30 includes a shaft 72 which is inserted through spool 32 of film cartridge 26. Accordingly, shaft 72, in addition to effecting the advancing/rewinding of the filmstrip, also act as the plunger to deform the indicator from the first state to the second state. As such, the configuration of shaft 72 must be suited for both functions.

Figure 12A:
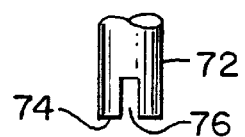
FIGS. 12(a) and 12(b) show a top and front elevation, respectively, of a plunger suitable for use with the present invention.
Figure 12B:
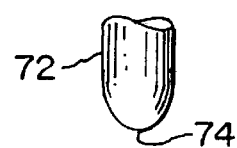
Figure 13A:
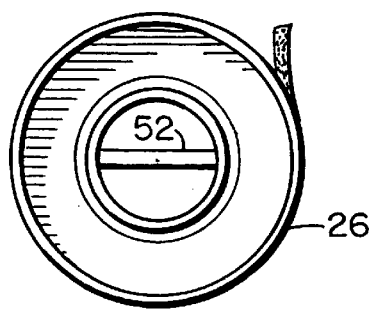
FIGS. 13(a) and 13(b) show a top elevation of a film cartridge having a rib.
Figure 13B:
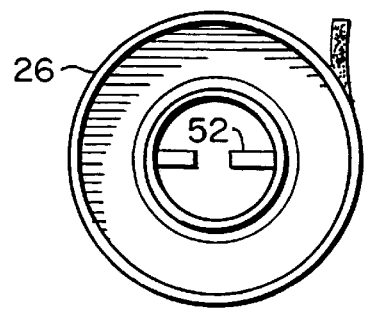

Accordingly, as illustrated in FIG. 12(a) and 12(b), an end 74 of shaft 72 is configured to effect the advancing/rewinding of the filmstrip and deform the indicator from the first state to the second state. As illustrated, end 74 includes a slot 76. Referring now to FIGS. 13 (a) and 13(b), rib 52 extends across at least a portion of the coaxial hole, and can be comprised of one or two portions. Slot 76 engages rib 52 to effect the advancing/rewinding of the filmstrip. Note that end 74 of shaft 72 does not include a knife edge or other sharp edge which could puncture or penetrate.

Figure 14:
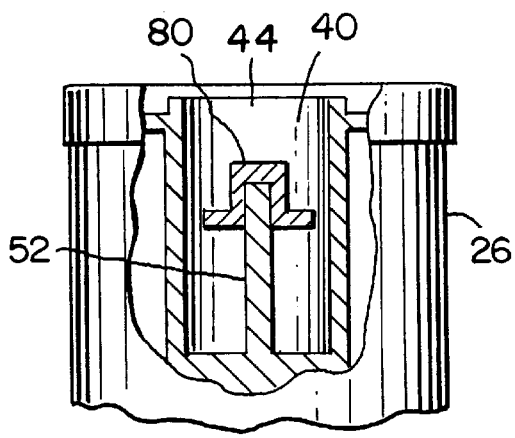
FIG. 14 shows a side elevation of a portion of a film cartridge in partial cross-sectional view, and an indicator in a first state according to a further embodiment of the present invention.
Figure 15:
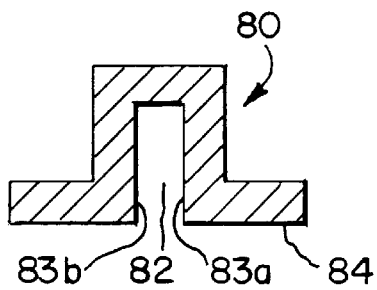
FIG. 15 shows an enlarged side elevation of the indicator shown in FIG. 14.
Figure 16A:
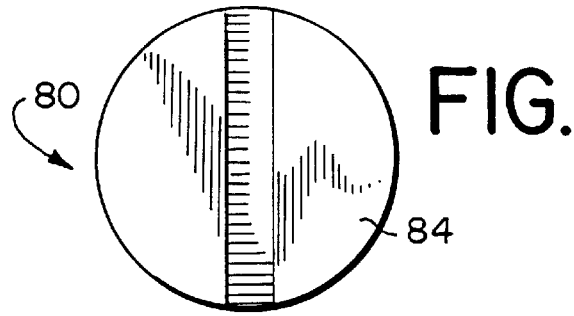
FIGS. 16(a) and 16(b) show possible top elevations of the indicator of FIG. 15.
Figure 16B:
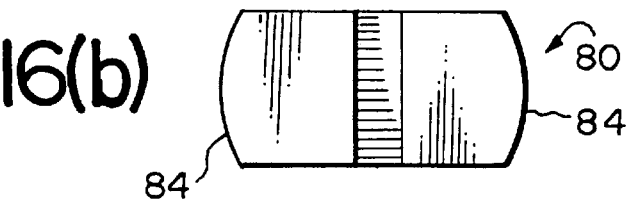

FIGS. 14 and 15 show an indicator 80 suitable for use with knob 30. In its first state, indicator 80 is configured as having a non-planar shape including a recessed area 82 having surfaces 83(a),83(b), and an extending portion 84. In a top view, indicator 80 can be of various shapes so as to be disposed within opening 44, for example, circular, oval, rectangular, or a combination thereof. Two examples are shown in FIGS. 16(a) and 16(b). When indicator 80 is disposed within opening 44 in the first state, recessed area 82 is in overlapping orientation with rib 52 and extending portion 84 is not abutting rib 52. Surfaces 83(a) and 83(b) may optionally be attached to rib 52, for example by an adhesive.

Figure 17:
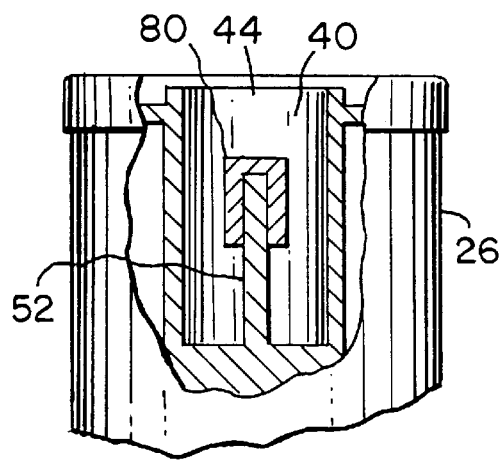
FIG. 17 shows a side elevation of a portion of a film cartridge in partial cross-sectional view, and the indicator of FIGS. 14 and 15 in a second state.

When the film cartridge is received in camera 70, end 74 of shaft 72 is inserted through opening 44 into hole 40, and slot 76 of end 74 abuts indicator 80. As end 74 is further received into opening 44, slot 76 forms about indicator 80 causing indicator 80 to deform into its second state, as shown in FIG. 17, which is visually different than the first state. As illustrated in FIG. 17, indictor 80 forms about rib 52 such that extending portion 84 abut and overlap rib 52. Accordingly, indicator 80 is changed from the first state to the second state in response to film cartridge 26 being received by a plunger. In both the first and second states, indicator 80 has a continuous, non-punctured, non-fractured configuration. A visual change of the indicator provides a user with an indication of whether the film cartridge has been disposed in a camera.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 10 | filmstrip; prior art |
| 12 | film cartridge; prior art |
| 20 | photographic camera |
| 22 | lens |
| 24 | eye lens |
| 26 | film cartridge |
| 28 | film cartridge chamber |
| 30 | advance/rewind knob |
| 31 | shaft |
| 32 | spool |
| 34,36 | annular flanges |
| 38 | core |
| 40,42 | coaxial holes |
| 44,46 | openings |
| 48,50 | ends |
| 52 | rib |
| 54 | plunger |
| 56 | end |
| 60 | indicator; first embodiment |
| 62 | indicator; second embodiment |
| 70 | photographic camera |
| 72 | shaft |
| 74 | end |
| 76 | slot |
| 80 | indicator; sixth embodiment |
| 82 | recessed portion |
| 83(a), 83(b) | surfaces |
| 84 | extending portion |

What is claimed is:

1. A film cartridge for use in a photographic camera having a plunger adapted to receive the film cartridge, the film cartridge comprising:
   a film spool having an elongate coaxial hole open at one end of the film spool; and
   an indicator disposed within the coaxial hole, said indicator having an head portion being deformable from a planar first state to a nonplanar second state in response to the film cartridge being received by the plunger in the photographic camera, the nonplanar second state being visually different than the planar first state, the head portion of the indicator having a deformable configuration in the planar first state and having a continuous, non-punctured, non-fractured configuration in both the planar first state and nonplanar second state.

2. The film cartridge according to claim 1 wherein the head portion of the indicator in the first state is a flat circular disk.

3. The film cartridge according to claim 1 wherein the head portion of the indicator in the second state has a cup shape.

4. The film cartridge according to claim 1 wherein the head portion of the indicator in the first state comprises a first color and the head portion in the second state comprises a second color different than the first color.

5. The film cartridge according to claim 1 wherein the head portion of the indicator in the first state is opaque and the head portion in the second state is transparent.

6. The film cartridge according to claim 1 wherein the head portion of the indicator in the first state includes readable indicia and the head portion in the second state includes non-readable indicia.

7. The film cartridge according to claim 1 wherein the film spool further comprises a rib extending across at least a portion of the coaxial hole, and the head portion of the indicator in the first state is comprised of a recessed area having surfaces and an extending portion, the recessed area overlapping the rib in the first state, the extending portion not abutting the rib in the first state.

8. The film cartridge according to claim 7 wherein the surfaces are adhered to the rib by an adhesive.

9. The film cartridge according to claim 1 wherein the extending portion of the indicator abuts the rib in the second state.

10. A photographic camera, comprising:
a film cartridge comprising a film spool having an elongate coaxial hole open at one end of the film spool, the film spool including an indicator disposed within the coaxial hole, the indicator having a head portion deformable from a planar first state to a nonplanar second state different than the planar first state, the head portion having a continuous, non-punctured, non-fractured configuration when in both the planar first state and nonplanar second state and
a film cartridge chamber having a plunger adapted to be received in the coaxial hole of the film spool at the open end, the head portion of the indicator deforming from the planar first state to the nonplanar second state in response to being received by the plunger, whereby an indication is provided that the film cartridge has been used in the photographic camera.

11. The photographic camera according to claim 10 wherein the head portion of the indicator in the first state is a flat circular disk.

12. The photographic camera according to claim 10 wherein the plunger includes a deforming end for deforming the head portion of the indicator from the first state to the second state as the plunger is received in the coaxial hole, the deforming end being free of a sharp edge.

13. A photographic camera, comprising:
a film cartridge comprising a film spool having an elongate coaxial hole open at one end of the film spool, the film spool including an indicator disposed within the coaxial hole, the indicator having a head portion, and a rib extending across at least a portion of the coaxial hole, the head portion of the indicator deformable from a planar first state to a nonplanar second state different than the planar first state, the head portion having a continuous, non-punctured, non-fractured configuration when in both the planar first state and nonplanar second state; and
a film rewind shaft receivable in the coaxial hole of the film spool at the open end, the head portion of the indicator deforming from the planar first state to the nonplanar second state in response to engagement of the rewind shaft with the rib, whereby an indication is provided that the film cartridge has been used in the photographic camera.

14. A film cartridge for use in a photographic camera having a plunger adapted to receive the film cartridge, the film cartridge comprising:
a film spool having an elongate coaxial hole open at one end of the film spool; and
an indicator disposed within the coaxial hole, said indicator having an head portion being deformable from either one of a convex or concave first state to an opposing one of said either one of a convex or concave second state in response to the film cartridge being received by the plunger in the photographic camera, the concave second state being visually different than the convex first state, the head portion of the indicator having a deformable configuration in the convex first state and having a continuous, non-punctured, non-fractured configuration in both the convex first state and concave second state.

15. A film cartridge for use in a photographic camera having a plunger adapted to receive the film cartridge, the film cartridge comprising:
a film spool having an elongate coaxial hole open at one end of the film spool; and
an indicator disposed within the coaxial hole, said indicator having an head portion being deformable from a concave first state to a convex second state in response to the film cartridge being received by the plunger in the photographic camera, the convex second state being visually different than the concave first state, the head portion of the indicator having a deformable configuration in the concave first state and having a continuous, non-punctured, non-fractured configuration in both the concave first state and convex second state.

16. A photographic camera, comprising:
a film cartridge comprising a film spool having an elongate coaxial hole open at one end of the film spool, the film spool including an indicator disposed within the coaxial hole, the indicator having a head portion deformable from a concave first state to a convex second state different than the concave first state, the head portion having a continuous, non-punctured, non-fractured configuration when in both the concave first state and convex second state; and
a film cartridge chamber having a plunger adapted to be received in the coaxial hole of the film spool at the open end, the head portion of the indicator deforming from the concave first state to the convex second state in response to being received by the plunger, whereby an indication is provided that the film cartridge has been used in the photographic camera.

17. A photographic camera, comprising:
a film cartridge comprising a film spool having an elongate coaxial hole open at one end of the film spool, the film spool including an indicator disposed within the coaxial hole, the indicator having a head portion deformable from a convex first state to a concave second state different than the convex first state, the head portion having a continuous, non-punctured, non-fractured configuration when in both the convex first state and concave second state; and
a film cartridge chamber having a plunger adapted to be received in the coaxial hole of the film spool at the open end, the head portion of the indicator deforming from the convex first state to the concave second state in response to being received by the plunger, whereby an indication is provided that the film cartridge has been used in the photographic camera.

* * * * *